United States Patent Office 3,196,148
Patented July 20, 1965

3,196,148
PROCESS FOR PRODUCTION OF 3-NITRO-5-ACYL-IMINODIBENZYL
Robert Albrecht and Henri Dietrich, Arlesheim, Basel-Land, and Fridolin Hefti, Riehen, Switzerland, assignors to Geigy Chemical Corporation, Greenburgh, N.Y., a corporation of Delaware
No Drawing. Filed Aug. 20, 1964, Ser. No. 390,991
Claims priority, application, Switzerland, Dec. 22, 1960, 14,297/60, 14,298/60
1 Claim. (Cl. 260—239)

This is a continuation-in-part of our copending application, Serial No. 161,250, filed December 21, 1961.

The present invention concerns a new process for the production of nitro derivatives of 5-acyl-imino-dibenzyls. These compounds are valuable intermediate products for the synthesis of the corresponding 3-amino compounds, which have antioxidant properties. These amino compounds can also be used as intermediate products for the synthesis of pharmaceuticals.

On nitrating dibenzoheterocyclic compounds having an imino group as heterocyclic ring member such as carbazole, phenoxazine and phenothiazine, first one or two nitro groups enter into one or both benzene nuclei in the para-position to such imino group, in the case of phenothiazine mono-oxidation of the sulphur atom occurs simultaneously. This disposition to occupy the para-position is further increased on acylation of an amino or imino group.

Surprisingly it has now been found that 3-nitro-5-acyl imino-dibenzyl compounds of the formula

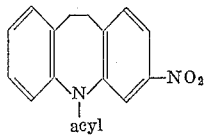

wherein

"Acyl" is an acyl radical, e.g., a lower alkanoyl radical as, for instance, acetyl, propionyl, isobutyryl, butyryl, valeroyl or isovaleroyl and furthermore a radical of an aromatic acid as for instance benzoyl can be produced by treating a 5-acyl-iminodibenzyl, e.g. 5-acetyl-iminodibenzyl, with substantially the equimolar amount of nitric acid in sulfuric acid. The nitro group in this reaction enters into the meta position of the acylimino group of the condensed heterocyclic ring system.

For the nitration, 5-acetyl-iminodibenzyl, for example, or another 5-acyl-iminodibenzyl is dissolved in ten to twenty times its weight of concentrated sulfuric acid and 0.9–1 mol of concentrated nitric acid (40° Bé.) per mol of 5-acyl-iminodibenzyl in concentrated sulfuric acid are added dropwise at temperatures between about −10° and +10° C., preferably between about 0° and about +5°C. The crude product, obtained by precipitation from the reaction solution with ice, is subjected to fractional crystallization, e.g., from benzene, ethanol or methanol, whereupon 3-nitro-5-acyl-iminodibenzyl is obtained. The 3-nitro-5-acetyl-iminodibenzyl crystallizes as colorless prisms which melt at 157°–158° C.

These above-given reaction conditions are critical; they lead to relatively pure 3-nitro-5-acyl-iminodibenzyls, which can be separated by simple crystallization from the reaction mixture. If one deviates from these reaction conditions, e.g., by working at a higher temperature or with more nitric acid, and increasing amount of 3,7-dinitro-5-acyl-iminodibenzyl is obtained from which the 3-nitro-product cannot be separated in a manner suitable for carrying out the process on an industrial scale.

The 3-nitro-5-acyl-iminodibenzyls are reduced advantageously by means of iron and acetic acid or hydrochloric acid according to Béchamp; however, other reduction processes such as e.g., treatment with zinc and acetic acid, and also catalytic hydrogenation, e.g., in the presence of Raney nickel, can also be employed.

3-amino-5-acyl-iminodibenzyls, in particular 3-amino-5-acetyl-iminodibenzyl, are valuable intermediate products for the production of iminodibenzyl derivatives which can be used for therapeutical purposes as they can be diazotized and the diazonium salts can be converted into 3-substituted iminodibenzyls and iminostilbenes such as, for example, the 3-chloro-, 3-bromo-, 3-hydroxy- and 3-methoxy- derivatives. From these, substances having particular psycho-pharmacological properties, e.g., antidepressive activity, are obtained, for example, by introduction of dialkylaminoalkyl radicals into the 5-position, e.g., the γ-dimethylaminopropyl radical or γ-dimethylamino-β-methylpropyl radical.

Up to now, 3-amino-5-acetyl-iminodibenzyl has been produced, e.g., from iminodibenzyl by a rather long chain of reactions, namely acetylation to the 5-acetyl-iminodibenzyl, introduction of the 3-acetyl group into the latter by means of acetyl chloride in the presence of aluminium chloride in carbon disulfide, conversion of the 3,5-diacetyl-iminodibenzyl obtained into 3-acetamido-5-acetyl-iminodibenzyl by treatment with hydrazoic acid according to Schmidt, and hydrolytic liberation of the 3-amino group with retention of the 5-acetyl radical.

The nitro derivatives of 5-acyl-iminodibenzyls according to the invention represent therefore easily accessible intermediate products for the production of the above-mentioned 3-amino-5-acyl-iminodibenzyls.

The following examples further illustrate the processes according to the invention without restricting the invention to the given examples. Unless otherwise stated, parts are given as parts by weight and the relationship of parts by weight to parts by volume is as that of grammes to cubic centimeters. Degrees are given in degrees centigrade.

Example 1

237 parts of 5-acetyl-iminodibenzyl are dissolved at room temperature in 3500 parts of concentrated sulfuric acid and a mixture of 95 parts of nitric acid, 40° Bé. (0.95 mol) and 400 parts of concentrated sulfuric acid is added dropwise to the solution while stirring at 0–5°. The reaction solution is stirred for 30 minutes at 0° and then poured into about 6000 parts of ice. The crystals which precipitate are filtered off under suction and washed neutral with water. The moist filter product is dissolved in 1000 parts by volume of benzene, the water is removed and 500 parts by volume of the benzene solution are distilled off. The solution which remains is cooled to 5°, the precipitated crystals are filtered off under suction, washed with a little cold benzene and dried. About 112 parts of 3-nitro-5-acetyl-iminodibenzyl (40, and even 45–50% theor.) are obtained. The product can also be worked up by dissolving the moist filter residue in 1000 parts by volume of hot 95% ethanol or hot methanol, then distilling off 500 parts by volume of the solvent, letting the concentrated solution stand at about 20°, filtering off the precipitated crystals under suction and washing with a little ethanol or methanol and drying. The yield of pure substance is the same as that obtained by the first method.

The pure 3-nitro-5-acetyl-iminodibenzyl melts at 157–158°, recrystallized from benzene, ethanol or methanol.

Example 2

In an analogous manner, starting with 251 parts of 5-propionyl-iminodibenzyl, M.P. 68–70°, instead of the 237 parts of 5-acetyl-iminodibenzyl in Example 1, 3-nitro-5-propionyl-iminodibenzyl is obtained, which can be recrystallized from ethanol or methanol, and which melts at 165–166°.

Starting with 299 parts of 5-benzoyl-iminodibenzyl, M.P. 126–127°, the product obtained is 3-nitro-5-benzoyl-iminodibenzyl, M.P. 178–180°, and starting with 279 parts of 5-isovaleroyl-iminodibenzyl, M.P. 66–67°, the product obtained is 3-nitro-5-isovaleroyl-iminodibenzyl, M.P. 115–116°.

We claim:

A process for the production of 3-nitro-5-acyl-iminodibenzyl of the formula

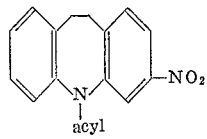

wherein
acyl is a member selected from the group consisting of acetyl, propionyl, butyryl, isobutyryl, valeroyl, isovaleroyl and benzoyl,
comprising
(a) dissolving N-acyl-iminodibenzyl wherein acyl has the foregoing meaning, in a sufficient amount of concentrated sulfuric acid;
(b) cooling the reaction mixture to a temperature in the range of −10° C. to +10° C., and, while maintaining the mixture at said temperature, slowly adding thereto while stirring a substantially equimolar amount of a mixture of 40° Bé. nitric acid and concentrated sulfuric acid in a volume ratio of about 1:4;
(c) pouring the reaction mixture on an amount of ice being at least equal to that of the sulfuric acid in said mixture; and
(d) recovering the compound of the above formula from the resulting solution.

No references cited.

NICHOLAS S. RIZZO, *Primary Examiner.*